United States Patent
Schenck et al.

(10) Patent No.: US 9,700,861 B2
(45) Date of Patent: Jul. 11, 2017

(54) SLURRY MIXER GATE HAVING ENHANCED EXTRACTOR PORTS

(71) Applicant: UNITED STATES GYPSUM COMPANY, Chicago, IL (US)

(72) Inventors: Ronald Edward Schenck, Valparaiso, IN (US); James R. Wittbold, Des Plaines, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 14/846,282

(22) Filed: Sep. 4, 2015

(65) Prior Publication Data

US 2017/0065950 A1 Mar. 9, 2017

(51) Int. Cl.
| | | |
|---|---|---|
| *B01F 15/02* | (2006.01) | |
| *B01F 7/00* | (2006.01) | |
| *B28C 7/16* | (2006.01) | |
| *B28C 5/08* | (2006.01) | |

(52) U.S. Cl.
CPC ...... *B01F 15/0266* (2013.01); *B01F 7/00758* (2013.01); *B01F 15/0292* (2013.01); *B28C 7/16* (2013.01); *B28C 5/0881* (2013.01)

(58) Field of Classification Search
CPC .................................................. B01F 15/0266
USPC ........ 366/64, 96–99, 162.1, 6, 8, 18, 20, 35, 366/38, 51, 65, 102, 141, 168.1, 171.1, 366/172.1, 172.2, 181.7, 303–304, 366/315–317; 156/39, 44
See application file for complete search history.

(56) References Cited

U.S. PATENT DOCUMENTS

| | | | | |
|---|---|---|---|---|
| 2,253,059 A | * | 8/1941 | Camp ................. | B01F 7/00758 366/65 |
| 3,459,620 A | * | 8/1969 | McCleary ............ | B28C 5/0881 156/346 |
| 5,638,635 A | | 6/1997 | Palladino | |
| 5,643,510 A | | 7/1997 | Sucech | |
| 5,683,635 A | * | 11/1997 | Sucech ............... | B28B 19/0092 156/346 |
| 6,193,408 B1 | * | 2/2001 | Miura ................. | B01F 7/00758 366/304 |
| 6,494,609 B1 | | 12/2002 | Wittbold et al. | |
| 6,874,930 B2 | | 4/2005 | Wittbold et al. | |
| 2003/0117891 A1 | * | 6/2003 | Wittbold ............... | B01F 3/1221 366/192 |

(Continued)

FOREIGN PATENT DOCUMENTS

WO WO 9967074 A1 * 12/1999 ............. B28B 13/02

*Primary Examiner* — Charles Cooley
(74) *Attorney, Agent, or Firm* — Greer, Burns & Crain, Ltd.; Pradip Sahu; Philip T. Petti

(57) ABSTRACT

A discharge gate is provided for delivering a mixed slurry from a gypsum slurry mixer, and includes a first extractor port configured for generating a first density slurry for a first gypsum layer, and a second extractor port configured for generating a second density slurry for a second gypsum layer. A channel is defined by a front panel and a side panel of the discharge gate for delivering the first and second density slurries from the slurry mixer. The first extractor port extends semi-tangentially from the front panel of the discharge gate, and is connected in fluid communication with the front panel via the channel and a first slurry passageway disposed within the first extractor port for delivering the first density slurry.

11 Claims, 2 Drawing Sheets

(56) References Cited

U.S. PATENT DOCUMENTS

| | | | | |
|---|---|---|---|---|
| 2004/0062141 A1* | 4/2004 | Shrader | ............ | B01F 5/0646 366/155.1 |
| 2005/0253098 A1* | 11/2005 | Petersen | ............ | F16K 7/06 251/4 |
| 2006/0045975 A1* | 3/2006 | Yamaji | ............ | B28B 19/0015 427/355 |
| 2007/0008815 A1* | 1/2007 | Nakamura | ............ | B01F 7/00766 366/172.1 |
| 2012/0308463 A1* | 12/2012 | Li | ............ | B01F 3/04446 423/265 |
| 2015/0328607 A1* | 11/2015 | Wittbold | ............ | B01F 15/0267 366/167.1 |
| 2016/0121287 A1* | 5/2016 | Brown | ............ | B28C 7/16 366/192 |
| 2017/0065950 A1* | 3/2017 | Schenck | ............ | B01F 15/0266 |

* cited by examiner

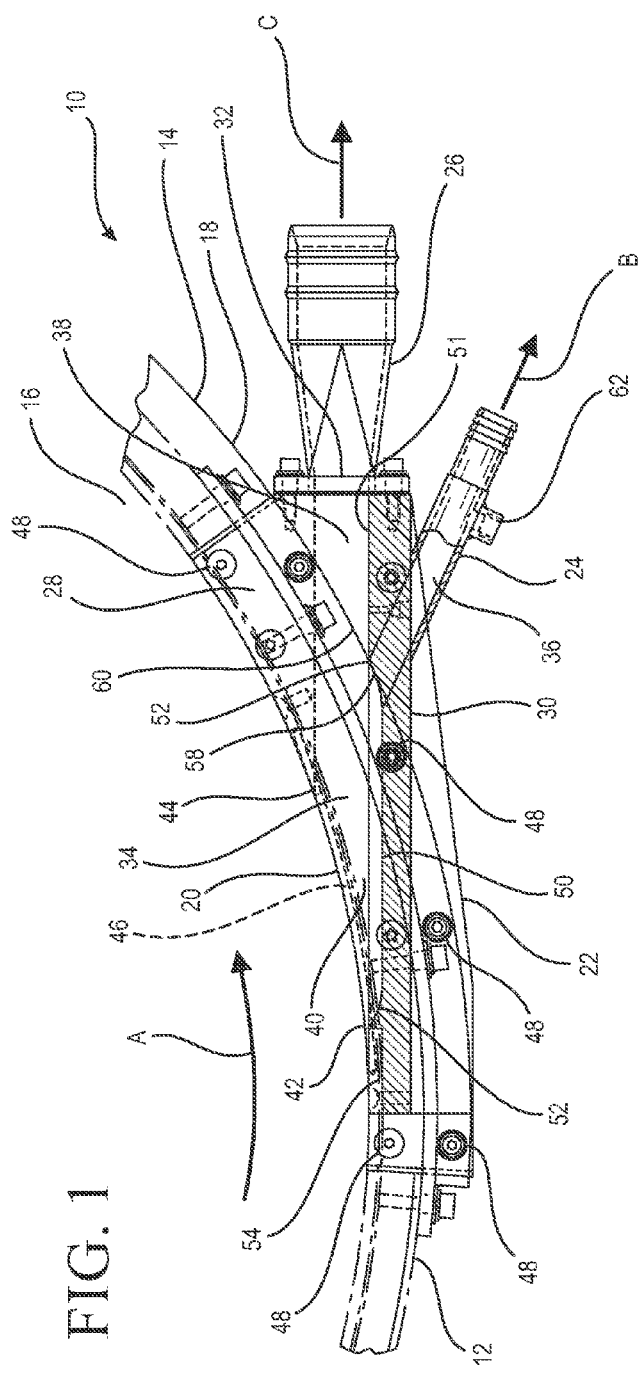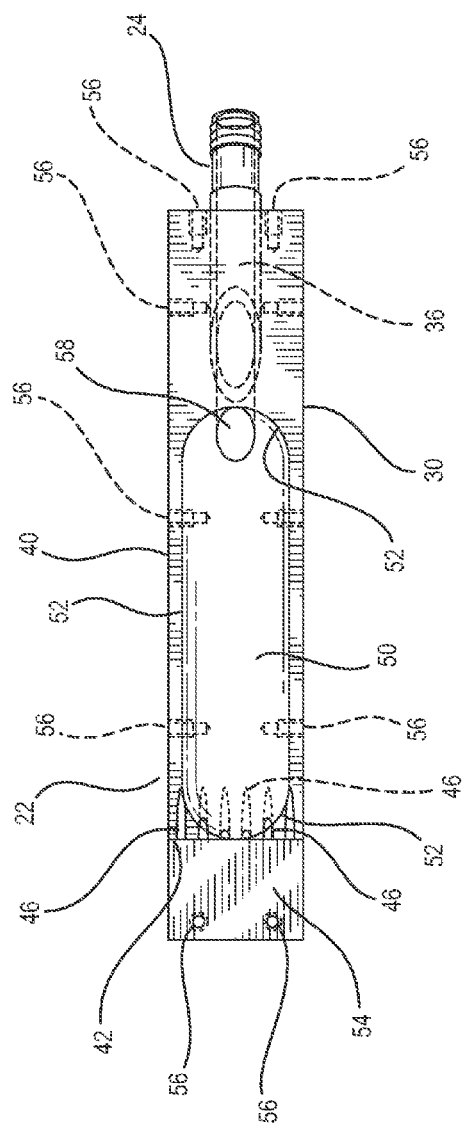

SLURRY MIXER GATE HAVING ENHANCED EXTRACTOR PORTS

BACKGROUND

The present disclosure generally relates to a method and apparatus for preparing gypsum products from starting materials including calcined gypsum and water, and more particularly to an improved apparatus for use in conjunction with a slurry mixer used in supplying agitated gypsum slurry to a wallboard production line.

It is well known to produce gypsum products by dispersing calcined gypsum in water to form a slurry, then casting the slurry into a desired shaped mold or onto a surface, and allowing the slurry to set to form hardened gypsum by reaction of the calcined gypsum (calcium sulfate hemihydrite or anhydrite) with the water to form hydrated gypsum (calcium sulfate dihydrate). It is also well known to produce a lightweight gypsum product by mixing an aqueous foam into the slurry to produce air bubbles. This will result in a desired distribution of voids in the set gypsum product. The voids lower the density of the final product, which is often referred to as "foamed gypsum."

Prior apparatus and methods for addressing some of the operational problems associated with the production of foamed gypsum are disclosed in commonly-assigned U.S. Pat. Nos. 5,638,635; 5,643,510; 6,494,609; and 6,874,930; all of which are incorporated by reference. In the present disclosure, a mixer includes, but is not limited to, a pin mixer, multipass mixer, pinless mixer, or other types of mixers commonly used in the formulation of gypsum slurries in the production of gypsum wallboard.

It is known in the art to produce wallboard panels with multi-layer gypsum construction, including a first gypsum layer located adjacent a face paper and having a first density, and a second gypsum layer applied upon the first layer. The second layer has a second density, and the density of the second layer is lower than that of the first layer. The higher density of the first layer, achieved by the injection of less foam or water, has been found to bond more securely to the face paper.

To efficiently deliver these two different density gypsum slurries, two separate extractor ports are used. Thus, a discharge gate of the mixer has a first extractor port configured for generating the higher density slurry for the first gypsum layer, and a second extractor port configured for generating the lower density slurry for the second gypsum layer. Typically, the first extractor port is disposed on a mixer sidewall, and connected to a separate entrance for receiving the mixed slurry. To address the chronic problem of unwanted premature setting of slurry that creates lumps in the mixture, an inlet opening of the discharge gate for receiving the mixed slurry is typically equipped with lump bars or grating. These bars prevent slurry lumps from entering into the discharge gate.

However, in certain applications, the grating is disposed too closely to the first extractor port, and causes slurry flow problems when the mixed slurry is delivered to the first extractor port. Specifically, fibers tend to accumulate, prematurely set and subsequently block the first extractor port, preventing the higher density slurry from entering the first port. As a result, all of the mixed slurry is delivered to the second extractor port only, and no higher density slurry is produced for the first gypsum layer. This results in bonding and strength problems in the multi-layer gypsum construction. Therefore, there is a need for an improved discharge gate having enhanced extractor ports for providing various density slurries during the wallboard production.

SUMMARY

The above production issues are addressed by the present apparatus that promotes an improved slurry flow and mixture inside the discharge gate, and provides an improved extractor port configuration. An important aspect of the present discharge gate is that an inlet opening of the first extractor port is located adjacent the inlet opening of the second extractor port. A specific location of the first extractor port behind the grating is proven to be advantageous because this configuration eliminates the need for the first extractor on the mixer sidewall. Further, this configuration eliminates the problems of plugging in the first extractor port. This particular location of the inlet openings has been discovered to be very beneficial in promoting desired density of the slurry without causing the slurry flow problems identified above.

Another important aspect of the present discharge gate is that the first extractor port is connected to an elongated cavity or pocket configured for receiving and compacting the slurry to create the higher density. More specifically, the cavity forms or braches off after the grating of an inlet opening of the present discharge gate for defining an additional space for pulling off a desired slurry volume. Supplementary volume tunings can be performed by a cage valve downstream of the slurry flow, or a pinch valve on a slurry hose connected to the corresponding port. As discussed above, aqueous foam or water can be injected into the pulled off slurry for density control.

In one embodiment, a discharge gate is provided for delivering a mixed slurry from a gypsum slurry mixer, and includes a first extractor port configured for generating a first density slurry for a first gypsum layer, and a second extractor port configured for generating a second density slurry for a second gypsum layer. A channel is defined by a front panel and a side panel of the discharge gate for delivering the first and second density slurries from the slurry mixer. The first extractor port extends semi-tangentially from the front panel of the discharge gate, and is connected in fluid communication with the front panel via the channel and a first slurry passageway disposed within the first extractor port for delivering the first density slurry.

In another embodiment, a discharge gate is provided for delivering a mixed slurry from a gypsum slurry mixer, and includes a front panel having an elongated pocket disposed on an inner surface of the front panel for receiving the mixed slurry, and a first extractor port extending semi-tangentially from the front panel and being connected in fluid communication with the front panel via a first slurry passageway disposed within the first extractor port for delivering the mixed slurry. The elongated pocket begins near one end of the first panel, and ends at an opposite end near an opening of the first slurry passageway.

BRIEF DESCRIPTION OF THE DRAWINGS

FIG. 1 is a fragmentary schematic plan view of a mixing apparatus, illustrating a partial horizontal cross-section of the present discharge gate having a first extractor port and a second extractor port;

FIG. 2 is a rear view of a front panel of the present discharge gate of FIG. 1, featuring the first extractor port extending from the front panel;

DETAILED DESCRIPTION

Figure 3:
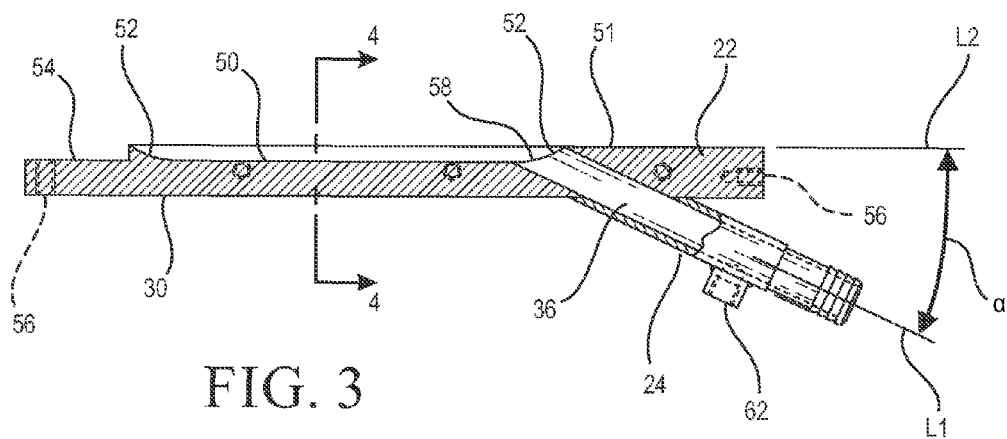
FIG. 3 is an enlarged view of the partial horizontal cross-section of the first extractor port of FIG. 1, extending from the front panel of the present discharge gate.

Referring now to FIG. 1, an exemplary mixing apparatus for mixing and dispensing a slurry is generally designated 10 and includes a mixer 12 having a housing 14 configured for receiving and mixing the slurry. The housing 14 defines a mixing chamber 16 which is preferably generally cylindrical in shape, and includes an upper radial wall (not shown), a lower radial wall (not shown) and an annular peripheral wall 18. In use, calcined gypsum and water are injected into the mixing chamber 16 by simple gravity feed. Also, as is well known in the art, other materials or additives in addition to gypsum and water, often employed in slurries to prepare gypsum products (e.g. accelerators, retarders, fillers, starch, binders, strengtheners, etc.) can also be supplied through these or other inlets similarly positioned. Wallboard slurry mixers are well known in the art and are described in greater detail in the patents referenced above.

Typically, an agitator (not shown) is disposed in the mixing chamber 16 operated by a conventional drive source, such as a motor, for rotating the agitator at whatever speed is appropriate for mixing the contents of the mixing chamber 16. Speeds in the range of 275-300 rpm are common. This rotation directs the resulting aqueous slurry in a generally centrifugal direction, such as in a counterclockwise outward spiral indicated by the arrow A. The direction of rotation is a function of the mixer and gate design and/or construction, and may vary to suit the application.

It should be appreciated that this depiction of an agitator is relatively simplistic and meant only to indicate the basic principles of agitators commonly employed in gypsum slurry mixing chambers known in the art. Alternative agitator designs, including those employing pins or paddles, are contemplated. In addition, the present gate design is contemplated for use with pin or pinless mixers used for agitating gypsum slurries.

At a mixer outlet 20, a discharge gate 22 is attached to the peripheral wall 18 of the mixer 12 for the discharge of the major portion of the well-mixed slurry. It is preferred that the discharge gate 22 has a first extractor port 24 configured for generating a first or higher density slurry for a first gypsum layer, and a second extractor port 26 configured for generating a second or lower density slurry for a second gypsum layer. For example, the relatively higher density slurry is dispensed via the first extractor port 24 in a direction indicated by the arrow B, and the relatively lower density slurry is dispensed via the second extractor port 26 in a direction indicated by the arrow C. A multi-layer gypsum wallboard is made using the first and second gypsum layers.

As is known in the art, the ultimate destination of the slurry emitted by the apparatus 10 is a gypsum wallboard production line, including a moving conveyor belt (not shown). While the geometry of the mixer outlet 20 is shown as rectangular in cross-section, other suitable shapes are contemplated depending on the application.

Also, while it is contemplated that the specific configuration of the mixer 12 may vary, it is preferred that the present mixer is of the centrifugal type commonly used in the manufacture of gypsum wallboard, and also of the type in which the discharge gate 22 dispenses the slurry semi-tangentially from the housing 14. A cutoff block 28 is connected to the discharge gate 22 to mechanically adjust the flow of slurry for the desired volume.

Referring now to FIGS. 1-3 and 5, it is preferred that the discharge gate 22 includes a front panel or plate 30 and a side panel or plate 32, wherein the front and side panels are attached together to define a channel 34 for delivering the mixed slurry from the mixing chamber 16.

An important aspect of the present discharge gate 22 is that the first extractor port 24 extends semi-tangentially from the front panel 30, and is connected in fluid communication with the front panel via the channel 34 and a first slurry passageway 36 disposed within the first extractor port for delivering the higher density slurry. The semi-tangential arrangement of the first extractor port 24 is described below in paragraphs relating to FIGS. 3 and 4.

Similarly, the second extractor port 26 extends transversely from the side panel 32, and is connected in fluid communication with the side panel via the channel 34. A second slurry passageway 38 is disposed within the second extractor port 26 for delivering the lower density slurry from the channel 34. Detailed arrangements of the first extractor port 24 are described below in paragraphs relating to FIGS. 3 and 4.

More specifically, during operation, an inlet opening 40 of the discharge gate 22 receives the mixed slurry from the mixing chamber 16, wherein the inlet opening is defined by a first edge 42 of the annular peripheral wall 18, and an opposite second edge 44 of the annular peripheral wall. The inlet opening 40 generally follows a contour or profile of the annular peripheral wall 18 of the housing 14 (FIG. 1).

A plurality of lump bars or grating 46 is connected at one end to the first edge 42 of the peripheral wall 18, and at an opposite end, to the second edge 44 of the peripheral wall, for preventing the slurry lumps from entering into the channel 34 of the discharge gate 22. Attachment of the front and side panels 30, 32 to the mixer 12 is achieved by using conventional fasteners 48 or other suitable technology, such as adhesives, welding, or the like known in the art.

In the preferred embodiment, an elongated cavity or pocket 50 configured for receiving and compacting the mixed slurry is disposed on an inner surface 51 of the front panel 30 for facilitating collection and creation of the higher density slurry. While an oval shape of the pocket 50 is shown in FIG. 2 for illustration purposes, other suitable geometric shapes, such as elliptical, rectangular, square, round, diamond, heart, or the like, are also contemplated to suit the application.

For accommodating a smooth transition of the mixed slurry from the mixing chamber 16 into the channel 34 and the pocket 50, a gradually inclined ramp or edge 52 is provided around an upper peripheral circumference of the pocket, preferably continuously following along a contour or profile of an outer edge of the pocket. In the preferred embodiment, a generally "L"-shaped, indented seat 54 is disposed at one end of the front panel 30 for matingly receiving the first edge 42 of the peripheral wall 18, and an opposite end of the front panel is attached to the side panel 32 of the discharge gate 22.

A plurality of transverse bores 56 are provided on an outer surface, such as a circumferential edge, of the front panel 30 for accommodating insertion of the fasteners 48. It is contemplated that at least one transverse bore 56 is also provided in the indented seat 54 for accommodating insertion of the fastener 48. In this configuration, the cavity or pocket 50 begins at one end near the indented seat 54, and ends at an opposite end near an opening 58 of the first slurry passageway 36 of the first extractor port 24. Thus, the pocket 50 forms or braches off after the grating 46 installed at the inlet opening 40 for providing an additional space for pulling off the desired slurry volume. It is preferred that the opening 58 of the first slurry passageway 36 is disposed near or adjacent an opening 60 of the second slurry passageway 38 when assembled.

Figure 5:
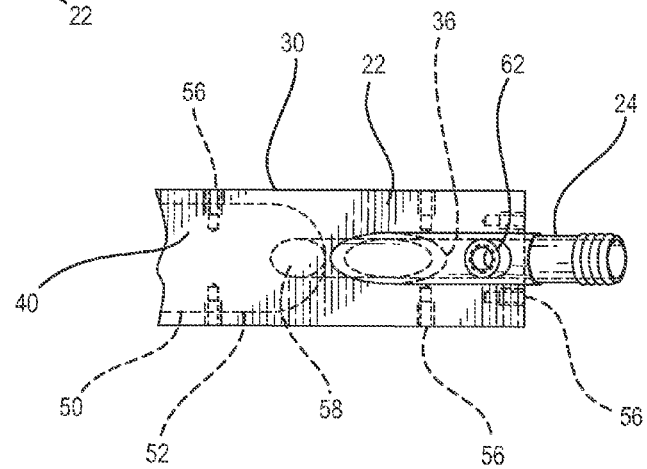
FIG. 5 is a fragmentary front view of the first extractor port extending from the front panel of the present discharge gate.

Referring now to FIGS. 1, 3 and 5, at least one of the first and second extractor ports 24, 26 has at least one injection opening or foam slot 62 positioned near or at a center of the corresponding slurry passageway 36, 38. While only one injection opening 62 is shown for illustration purposes, any number of openings is contemplated depending on the application. Locations of the openings 62 are preferably in the middle of the slurry passageway 36, 38, but other locations in the passageway are contemplated to suit the application.

It is preferred that the opening 62 is circular, but other suitable geometrical shapes, such as linear, elliptical, square, and irregular figures, are contemplated. As discussed above, the foam, water, or treatment material is injected through the injection opening 62 for introduction of aqueous foam or other desired additives. Depending on the location of the injection opening 62, the discharge gate 22 may have a single upper or lower injection port, or multiple injection ports to suit the application.

Figure 4:
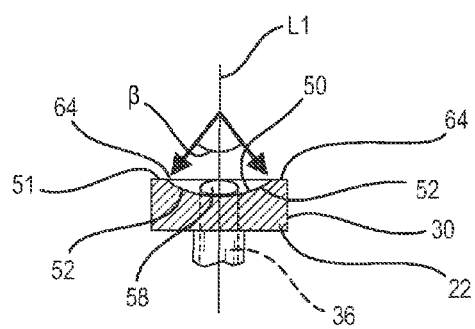
FIG. 4 is a cross-section taken along the line 4-4 of FIG. 3 and in the direction generally indicated.

Referring now to FIGS. 1 and 3-4, it is contemplated that the semi-tangential arrangement of the first extractor port 24 refers to an angular configuration of the first extractor port relative to the front panel 30. Unlike typical radial or tangential arrangements in conventional extractors, the first extractor port 24 extends semi-tangentially from an outer surface of the front panel 30 of the present discharge gate 22.

More specifically, an exemplary angle α (FIG. 3) between a longitudinal axis L1 of the first extractor port 24 and the longitudinal axis L2 of the front panel 30 is approximately 25 degrees, such that the first extractor port gradually inclines from the outer surface of the front panel for a predetermined distance. It is contemplated that an amount of the predetermined distance is variable to suit the application. In the preferred embodiment, the semi-tangential arrangement of the first extractor port 24 refers to the angle α having an oblique angle defined by the longitudinal axes L1 and L2. Other oblique angles are contemplated, whether obtuse or acute. This semi-tangentially inclined first extractor port 24 facilitates a smooth flow of the mixed slurry from the elongated pocket 50, and thus does not disrupt the slurry flow while entering into the first slurry passageway 36.

Another exemplary angle β (FIG. 4) defined by an inner surface of the elongated pocket 50, which is measured between opposite edges 64 of the pocket relative to the longitudinal axis L1 of the first extractor port 24, is approximately 65 degrees. Further, it is preferred that the opening 58 of the first slurry passageway 36 is entirely encircled within the space defined by the pocket 50 when viewed from the side. While an oval shape of the opening 58 of the first slurry passageway 36 is shown in FIG. 4 for illustration purposes, other suitable shapes, such as circular, square, and other irregular figures, are also contemplated to suit different applications. This configuration of the pocket 50 allows a more uniform distribution and a more consistent delivery of the mixed slurry into the first slurry passageway 36 during operation.

Advantageously, it has been discovered that the present discharge gate configuration, particularly with the first extractor port 24 and the elongated pocket 50, has facilitated the dispensing of gypsum slurries from mixers with reduced lumps or blockage effects, while maintaining desired slurry flow densities and volumes. Also, the introduction of the foam or other additives into the slurry is performed so that the slurry density is further controlled as desired.

While a particular embodiment of the present discharge gate has been shown and described, it will be appreciated by those skilled in the art that changes and modifications may be made thereto without departing from the present disclosure in its broader aspects, and as set forth in the following claims.

What is claimed is:

1. A discharge gate for delivering a mixed slurry from a gypsum slurry mixer, comprising:
   a first extractor port configured for generating a first density slurry for a first gypsum layer;
   a second extractor port configured for generating a second density slurry for a second gypsum layer;
   a channel defined by a front panel and a side panel of the discharge gate for delivering the first and second density slurries from the slurry mixer;
   a pocket configured for receiving the mixed slurry is disposed on an inner surface of the front panel;
   said pocket has a gradually inclined ramp around an upper peripheral circumference of the pocket, continuously following along a contour of an outer edge of the pocket; and
   wherein the first extractor port extends semi-tangentially from the front panel of the discharge gate, and is connected in fluid communication with the front panel via the channel and a first slurry passageway disposed within the first extractor port for delivering the first density slurry.

2. The discharge gate of claim 1, wherein the second extractor port extends transversely from the side panel of the discharge gate, and is connected in fluid communication with the side panel via the channel and a second slurry passageway disposed within the second extractor port for delivering the second density slurry.

3. The discharge gate of claim 1, wherein an indented seat is disposed at one end of the front panel, and an opposite end of the front panel is attached to the side panel.

4. The discharge gate of claim 1, wherein the pocket begins near one end of the front panel, and ends at an opposite end near an opening of the first slurry passageway.

5. The discharge gate of claim 1, wherein the pocket has a predetermined angle defined by an inner surface of the pocket, the angle being measured between opposite edges of the pocket relative to a longitudinal axis of the first extractor port.

6. The discharge gate of claim 1, wherein an opening of the first slurry passageway is entirely encircled within the space defined by the pocket when viewed from a side facing an opening of the pocket.

7. The discharge gate of claim 1, wherein a first opening of the first slurry passageway is disposed adjacent a second opening of a second slurry passageway disposed within the second extractor port for delivering the second density slurry.

8. The discharge gate of claim 1, wherein at least one of the first and second extractor ports has at least one injection opening positioned on the corresponding slurry passageway.

9. The discharge gate of claim 1, wherein the first extractor port gradually inclines from an outer surface of the front panel for a predetermined distance at a predetermined angle relative to longitudinal axes of the first extractor port and the front panel.

10. A discharge gate for delivering a mixed slurry from a gypsum slurry mixer, comprising:
   a front panel having an elongated pocket disposed on an inner surface of the front panel for receiving the mixed slurry;
   a first extractor port extending semi-tangentially from the front panel and being connected in fluid communication with the front panel via a first slurry passageway disposed within the first extractor port for delivering the mixed slurry;
   an opening of the first slurry passageway is entirely encircled within the space defined by the pocket when viewed from a side facing an opening of the pocket; and
   wherein the elongated pocket begins near one end of the front panel, and ends at an opposite end near an opening of the first slurry passageway.

11. A discharge gate for delivering a mixed slurry from a gypsum slurry mixer, comprising:
   an inlet opening in fluid communication with the mixer for receiving said mixed slurry;
   a grating fixed in said inlet opening for preventing slurry lumps from passing out the mixer;
   a first extractor port disposed on an outlet side of said grating and is configured for generating a first density slurry for a first gypsum layer;
   a second extractor port disposed adjacent said first extractor port and also on said outlet side of said grating and is configured for generating a second density slurry for a second gypsum layer;
   a channel defined by a front panel and a side panel of the discharge gate for delivering the first and second density slurries from the slurry mixer;
   a pocket configured for receiving the mixed slurry is disposed as an elongate recess depressed from an inner surface of the front panel; and
   said first extractor port extends semi-tangentially from the front panel of the discharge gate, has an opening located in said pocket and defines a first slurry passageway in fluid connection with said pocket and said channel and said first slimy passageway being disposed within the first extractor port for delivering the first density slurry.

* * * * *